US012803847B2

(12) United States Patent
Rowe et al.

(10) Patent No.: US 12,803,847 B2
(45) Date of Patent: Nov. 17, 2026

(54) SMOOTHING UNIVARIATE SIGNAL EDGES WITH STABLE AND UNSTABLE SUBSEQUENCE DETECTION AND GEOMETRIC EXTRAPOLATION

(71) Applicant: Oracle International Corporation, Redwood Shores, CA (US)

(72) Inventors: Matthew Charles Rowe, Bletchley (GB); Sahil Malhotra, Hampton (GB); Sergio Aldea Lopez, Valladolid (ES); Oleg Gennadievich Shevelev, Chislehurst (GB); Alberto Polleri, London (GB)

(73) Assignee: Oracle International Corporation, Redwood Shores, CA (US)

( * ) Notice: Subject to any disclaimer, the term of this patent is extended or adjusted under 35 U.S.C. 154(b) by 47 days.

(21) Appl. No.: 19/172,338

(22) Filed: Apr. 7, 2025

(65) Prior Publication Data

US 2025/0240189 A1 Jul. 24, 2025

Related U.S. Application Data

(63) Continuation of application No. 18/339,065, filed on Jun. 21, 2023, now Pat. No. 12,301,388.

(51) Int. Cl.
*H04L 25/03* (2006.01)

(52) U.S. Cl.
CPC .................. *H04L 25/03006* (2013.01); *H04L 2025/03598* (2013.01)

(58) Field of Classification Search
CPC ................ H04L 25/03006; H04L 2025/03598
USPC .......................................................... 375/346
See application file for complete search history.

(56) References Cited

U.S. PATENT DOCUMENTS 12,301,388 B2 * 5/2025 Rowe ................ H04L 25/03006
2014/0093183 A1 * 4/2014 Ting .......................... G06T 7/20 382/254
2015/0288586 A1 * 10/2015 McClellan ................ H04L 1/08 709/224
2021/0088541 A1 * 3/2021 Apker .................. C12Q 1/6869
2021/0158211 A1 * 5/2021 Talwar ................ G06F 21/6245

* cited by examiner

*Primary Examiner* — Emmanuel Bayard
(74) *Attorney, Agent, or Firm* — Invoke

(57) ABSTRACT

Techniques for smoothing a signal are disclosed. The system partitions the portion of the data sequence into a stable subsequence and an unstable subsequence of data points. The system applies a smoothing function that replaces the unstable subsequence of data points with another subsequence of data points, based at least in part on the stable subsequence, to create a smoothed, more stable subsequence.

20 Claims, 7 Drawing Sheets

SMOOTHING UNIVARIATE SIGNAL EDGES WITH STABLE AND UNSTABLE SUBSEQUENCE DETECTION AND GEOMETRIC EXTRAPOLATION

INCORPORTION BY REFERENCE; DISCLAIMER

Each of the following applications are hereby incorporated by reference: application Ser. No. 18/339,065 filed on Jun. 21, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to signal smoothing for at least a portion of a sequence of data points.

BACKGROUND

Signal smoothing is useful in many applications where a trend in data may be obscured by noise or other disruptions in the data points in a sequence of data points. Signal smoothing generally uses information from data points that surround an outlying data point to adjust the outlier to a value that fits more closely to its surrounding values. Data points at the beginning or end of a signal, however, can be harder to smooth correctly or at all, often resulting in large deviations or no correction at all. Signal smoothing processes may also require user input prior to the smoothing process to set parameters such as a window size or a polynomial order for the smoothing process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SIGNAL SMOOTHING ARCHITECTURE
3. PARTIONING AND SMOOTHING A SIGNAL
4. EXAMPLE EMBODIMENT
5. PRACTICAL APPLICATIONS, ADVANTAGES, AND IMPROVEMENTS
6. COMPUTER NETWORKS AND CLOUD NETWORKS
7. HARDWARE OVERVIEW
8. MISCELLANEOUS; EXTENSIONS

1. General Overview

One or more embodiments perform signal smoothing on at least a portion of a sequence of data points. A system partitions the portion of the data sequence into a stable subsequence and an unstable subsequence of data points. The system applies a rate of change exhibited by the stable subsequence to the unstable subsequence to create a smoothed, more stable subsequence.

The system identifies the stable and unstable subsequences in the portion of the sequence of data points. The system iteratively divides the portion into a pair of subsets of data points. The system determines an amount of negative difference changes between adjacent pairs of data points within a subset. At each iteration, the system divides the portion into different subsets so that multiple different subsets are tested. A subset that exhibits an amount of negative difference changes larger than an instability threshold may be unstable, while a subset that exhibits an amount of negative difference changes smaller than a stability threshold may be stable. The system may determine respective significance probabilities for the stable and unstable subsets based on the amount of negative difference changes in each. When a value based on the respective significance probabilities for a pair of subsets is minimized with respect to that value for other pairs of subsets, the system identifies the pair of subsets as the stable and unstable subsequences in the portion of the sequence. The system may be configured to smooth the first 10-20% and/or the last 10-20% of a sequence of data points.

One or more embodiments described in this Specification and/or recited in the claims may not be included in this General Overview section.

2. Signal Smoothing Architecture

Figure 1:
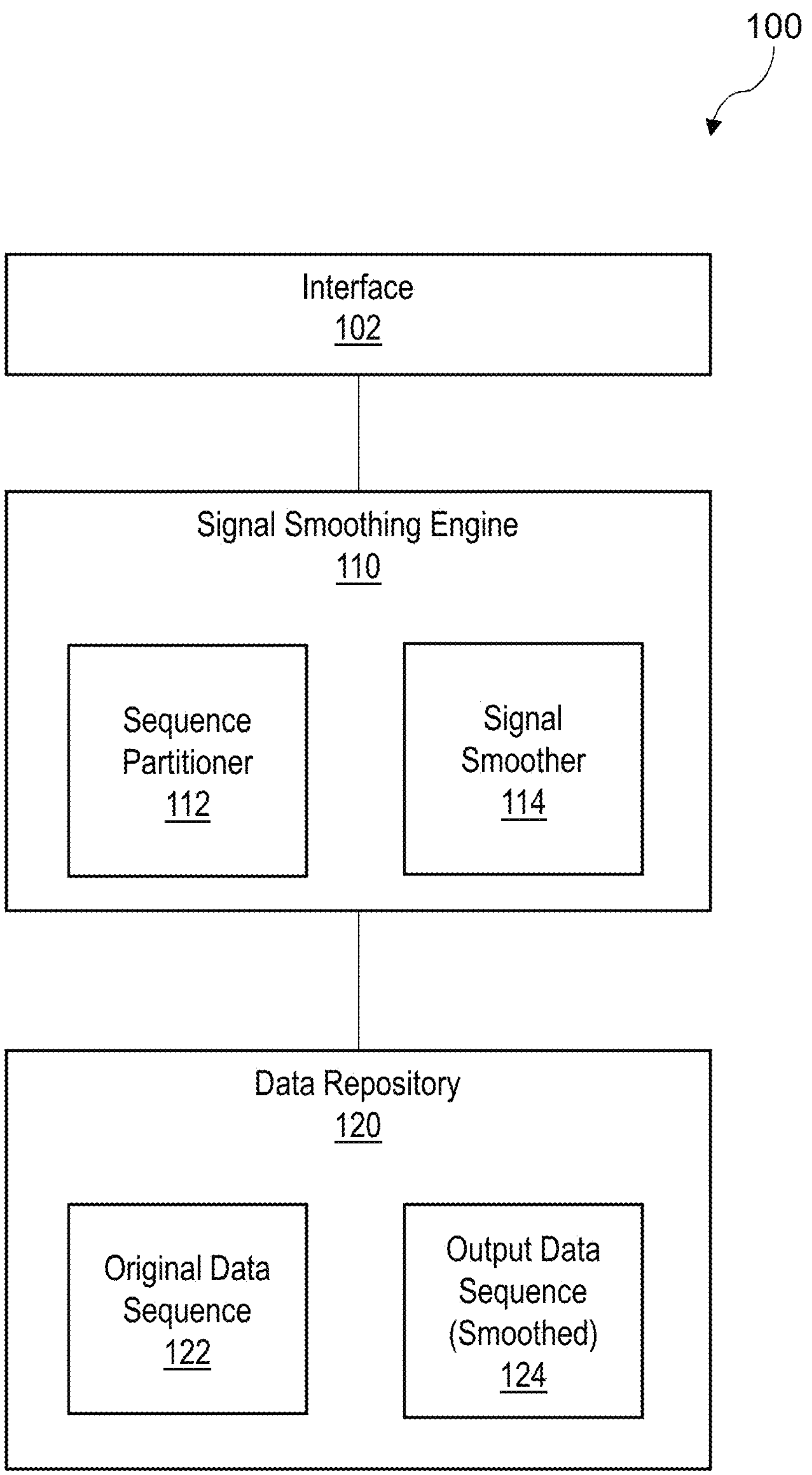
FIG. 1 illustrates a system in accordance with one or more embodiments.

FIG. 1 illustrates a system 100 in accordance with one or more embodiments. As illustrated in FIG. 1, system 100 includes an interface 102, a signal smoothing engine 110, and a data repository 120. The signal smoothing engine 110 may include one or more functional components such as a signal partitioner 112 and a signal smoother 114.

In one or more embodiments, the signal smoothing engine 110 refers to hardware and/or software configured to perform operations described herein for smoothing a signal. The signal smoothing engine 110 may receive an original data sequence 122 via the interface 102, or from a software application (not shown) that requests signal smoothing. The original data sequence 122 may represent raw, unsmoothed data points from a univariate signal. The original data sequence 122 may represent a sequence of data points that has been at least partially processed by another application or algorithm. The signal smoothing engine 110 may store an output smoothed data sequence 124 from the signal smoother 114 in the data repository. Additionally, or alternatively, the signal smoothing engine 110 may present the output data sequence 124 via the interface 102, for example, as a graph or a table of values.

The sequence partitioner 112 refers to hardware and/or software configured to identify unstable and stable subsequences of data points in a portion of a sequence of data points. The sequence partitioner 112 may select a portion of the original data sequence 122, e.g., the first 10-20% of the sequence 122 and/or the last 10-20% of the sequence 122. Within that portion, the sequence partitioner 112 may test different groupings or subsets of adjacent data points to identify a stable subsequence and an unstable subsequence. In one or more embodiments, a stable subsequence in a monotonic univariate signal may exhibit generally relatively few fluctuations over the length of the subsequence. Stable growth may be determined from a lower than threshold percentage of decreases between the values of adjacent data points within the length of the subsequence. In one or more embodiments, an unstable subsequence in a univariate signal may exhibit a higher than threshold percentage of decreases between the values of adjacent data points within the length of the subsequence. At the beginning of an original data sequence 124, an unstable subsequence may occur prior to a stable subsequence chronologically. At the end of an original data sequence 124, an unstable subsequence may occur after a stable subsequence chronologically.

The signal smoother 114 refers to hardware and/or software configured to smooth the unstable subsequence according to a rate of change determined from the stable subsequence. Once a stable subsequence is identified in the portion of the original data sequence 122, the signal smoother 114 may determine a rate of change within the stable subsequence. The rate of change may be an average rate of change over the stable sequence. The signal smoother 114 may then apply the rate of change to the unstable subsequence and may replace the values in the original unstable subsequence with adjusted values. In one or more embodiments, the signal smoother 114 may geometrically extrapolate over the unstable subsequence from the stable subsequence using the rate of change. Examples of operations for partitioning and smoothing a signal are described below with reference to FIG. 2.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or executed on the same computing system as signal smoothing engine 110. Alternatively, or additionally, a data repository 120 may be implemented or executed on a computing system separate from signal smoothing engine 110. The data repository 120 may be communicatively coupled to signal smoothing engine 110 via a direct connection or via a network.

Information describing data sequences and processing parameters may be implemented across any of the components within the system 100. However, this information is illustrated within the data repository 120 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 102 refers to hardware and/or software configured to facilitate communications between a user and the signal smoothing engine 110. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

3. Partioning and Smoothing a Signal

Figure 2A:
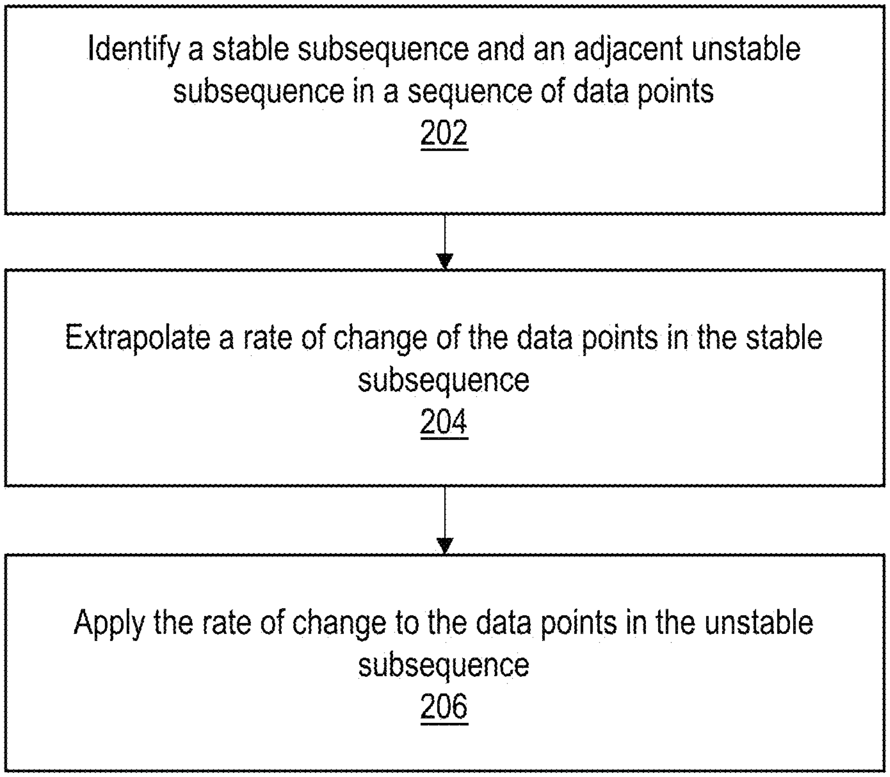
FIG. 2A illustrates an example set of operations for smoothing the edges of a signal in accordance with one or more embodiments.

FIG. 2A illustrates an example set of operations for smoothing a signal in accordance with one or more embodiments. One or more operations illustrated in FIG. 2 may be modified, rearranged, or omitted all together. Accordingly, the particular sequence of operations illustrated in FIG. 2A should not be construed as limiting the scope of one or more embodiments.

In one or more embodiments, the sequence partitioner 112 identifies a stable subsequence and an adjacent unstable subsequence in a sequence of data points (Operation 202). The sequence partitioner 112 may select a portion of an original data sequence, for example, the beginning 10-20% or the last 10-20% of the original data sequence. Within the selected portion, the sequence partitioner 112 may traverse the data points to determine whether a grouping of consecutive data points changes in an expected or unexpected way. For example, for a univariate signal that is expected to be generally monotonically increasing, the sequence partitioner 112 may determine whether a subsequence of consecutive data points has generally increasing values, or whether the values of the consecutive data points increase and decrease. In another example, for a sinusoidal signal, the sequence partitioner 112 may determine whether a subsequence of consecutive data points increases and decreases according to the amplitude and frequency of the signal, or whether the values of the consecutive data points change in a way that is not consistent with the frequency and amplitude. The sequence partitioner 112 may consider a subsequence that changes in an expected predictable way to be stable. The sequence partitioner 112 may consider a subsequence that changes in an unexpected and/or unpredictable way to be unstable. An example of a partitioning process is explained further with respect to FIG. 2B.

In one or more embodiments, the signal smoother 114 extrapolates a rate of change of the data points in the stable subsequence (Operation 204). For example, for the end of an original data sequence, assume a univariate portion $\{x_1, x_2, \ldots, x_n\}$ which has been partitioned into a stable sub-sequence $\{x_1, x_2, \ldots, x_{m-1}\}$ and an unstable subsequence $\{x_m, x_{m+1}, \ldots, x_n\}$. The stable subsequence may be generally smooth and changing monotonically. The unstable subsequence may be non-monotonic and contain many oscillations. The nth value is the final element in the entire sequence. At the end portion of an original data sequence, the stable subsequence may occur before the unstable subsequence chronologically.

In the stable subsequence, the changes between the values of the data points can be defined as a geometric sequence, for example: $x_1=a$; $x_2=ar$; $x_3=ar^2$; . . . $x^{m-1}=ar^{m-2}$. In practice, the growth rate r may not be stable, however, the signal smoother 114 may capture the distribution (R) of different r values across the series:

$$x_1 = a$$
$$x_2 = ar_2$$
$$x_3 = ar_2r_3$$
$$\ldots$$
$$x_n = a\prod_{i=2}^{n} r_i$$

The signal smoother 114 may then take either the expectation (E[R]) or the 50th quantile (median) of R to capture the growth rate across the sequence on average to obtain a rate of change $\bar{r}$.

In the one or more embodiments, the signal smoother 114 applies the rate of change to the data points in the unstable subsequence (Operation 206). The signal smoother 114 may replace the values in the unstable sub-sequence $\{x_m, x_{m+1}, \ldots, x_n\}$ by extrapolating from the data point in the stable subsequence that is adjacent to the unstable subsequence over the unstable subsequence using the average growth rate $\bar{r}$, as follows.

$$x_m = x_{m-1}\bar{r}$$
$$x_{m+1} = x_{m-1}\bar{r}^2$$
$$x_{m+2} = x_{m-1}\bar{r}^3$$
$$\ldots$$
$$x_n = x_{m-1}\bar{r}^{n-m}$$

The rate of change from the stable subsequence forms the basis for geometric extrapolation as the signal smoother 114 uses information about the growth in the stable sub-sequence to extrapolate geometrically over the unstable subsequence. Note that when smoothing the beginning portion of a signal, the unstable subsequence usually occurs before the stable subsequence chronologically, that is, for portion $\{x_1, x_2, \ldots, x_n\}$, the sub-sequence $\{x_1, x_2, \ldots, x_{m-1}\}$ is unstable, while the subsequence $\{x_m, x_{m+1}, \ldots, x_n\}$ is stable. The smoothing process is reversed in direction, proceeding from $x_n$ backwards to $x_m$ to identify the rate of change, and then replacing the values of $x_{m-1}$ backwards to $x_1$ based on the value of $x_m$.

Other types of extrapolation may be used depending on the characteristics of the original data sequence. For example, linear extrapolation may be used for linear data signals; Fourier extrapolation may be used for a sinusoidal signal; or polynomial extrapolation may be used for a signal that is a polynomial curve.

Figure 2B:
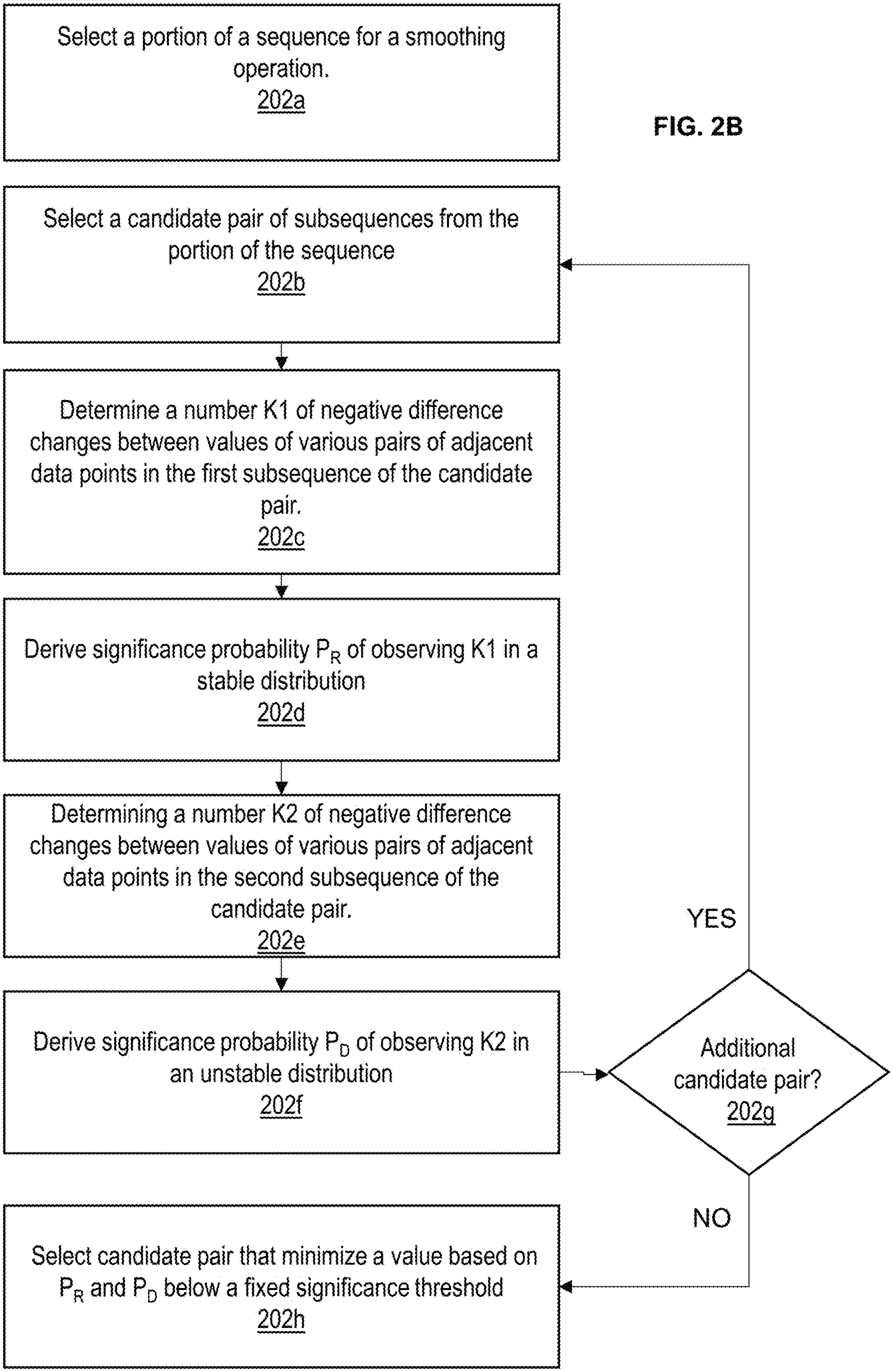
FIG. 2B illustrates an example set of operations for partitioning a signal into stable and unstable subsequences in accordance with one or more embodiments.

FIG. 2B illustrates an example of operations for partitioning a data sequence into stable and unstable subsequences for Operation 202. One or more operations illustrated in FIG. 2B may be modified, rearranged, or omitted all together. Accordingly, the particular sequence of operations illustrated in FIG. 2B should not be construed as limiting the scope of one or more embodiments.

In one or more embodiments, the sequence partitioner 112 selects a portion of a sequence for a smoothing operation (Operation 202*a*). The sequence partitioner 112 may select a portion $\{x_1, x_2, \ldots, x_n\}$ at the beginning or end of an original data sequence.

In one or more embodiments, the sequence partitioner 112 selects a candidate pair of subsequences from the portion of the sequence (Operation 202*b*). The sequence partitioner 112 may, for example, initially divide the sequence in half or as close to half as possible if there are an odd number of data points in the portion. The sequence partitioner 112 may initially divide the sequence unevenly, for example, for a portion at the end of the original data sequence, the portion may be divided at the $90^{th}$ percent index element from the start of the portion. The subsequences in the candidate pair are disjoint, meaning that the two subsequences do not share any data points in common. One data point in one subsequence in the candidate pair will be adjacent to one data point in the other subsequence. For example, the first candidate pair may be a first subsequence $\{x_1, x_2, \ldots, x_{m-1}\}$ and a second subsequence $\{x_m, x_{m+1}, \ldots, x_n\}$. The first candidate pair may also be $\{x_k\}, x_{k+1}, \ldots, x_{m-1}\}$ and $\{x_m, x_{m+1}, \ldots, x_n\}$, where $k \in \{k_0, k_1, \ldots, n-5\}$ and $m \in \{k+5, k+6, \ldots, n\}$. The index $k_0$ may be 1 or may be a later data point in the portion.

In one or more embodiments, the sequence partitioner 112 determines a number K1 of negative difference changes between values of various pairs of adjacent data points in the first subsequence of the candidate pair (Operation 202*c*). The sequence partitioner 112 may traverse the first subsequence $\{x_k\}, x_{k+1}, \ldots, x_{m-1}\}$ and determine the difference between each consecutive pair of adjacent points to obtain a sequence of value differences $\{\Delta_k, \Delta_{k+1}, \ldots, \Delta_{m-2}\}$ where $\Delta_k = x_{k+1} - x_k$. For example, if a subsequence includes the values {4, 5, 2, 8, 10}, the sequence of value differences would be {1, −3, 6, 2}. The sequence partitioner 112 may then derive the distribution of consecutive difference convolutions: $\Delta_k \cdot \Delta_{k+1}$ and then count the number of times that the difference convolutions are negative:

$$K = \sum_{i=k}^{m-3} \Delta_i \cdot \Delta_{i+1} < 0.$$

The value of K for the above example sequence would be 1.

In one or more embodiments, the sequence partitioner 112 derives a significance probability $P_R$ of observing K1 in a stable distribution (Operation 202*d*). The sequence partitioner 112 may define a test distribution as:

$$B(m-3-k,\ p=0.1) \qquad \text{Equation 1}$$

Equation 1 assumes that a stable sequence will have chance fluctuations (i.e., oscillating growth rates) for 10% (I=0.1) of the sequence. Given this probability distribution, the sequence partitioner 112 may derive the significance probability $P_R$ of observing K1 growth rate fluctuations using a one-tailed test (i.e., the probability of observing K1 or fewer growth rate fluctuations in the stable sequence).

In one or more embodiments, the sequence partitioner 112 determines a number K2 of negative difference changes between values of various pairs of adjacent data points in the second subsequence of the candidate pair (Operation 202*e*). Operation 202*e* is identical to Operation 202*c* but applied to the other subsequence in the candidate pair, i.e., to $\{x_m, x_{m+1}, \ldots, x_n\}$.

In one or more embodiments, the sequence partitioner 112 derives a significance probability $P_D$ of observing K2 in an unstable distribution (Operation 202*f*). Operation 202*f* is similar to Operation 202*d*, however, the test distribution may be:

$$B(n-2-m,\ p=0.2) \qquad \text{Equation 2}$$

Equation 2 assumes that an unstable sequence will have chance fluctuations for 20% (p=0.2) of the sequence. Given this probability distribution, the sequence partitioner 112 may derive the significance probability $P_D$ of observing K2 growth rate fluctuations using a one-tailed test (i.e., the probability of observing K2 or more growth rate fluctuations in the unstable sequence).

In one or more embodiments, the sequence partitioner 112 determines whether there is another candidate pair of subsequences to test (Operation 202*g*). When there are more candidate pairs to test, the sequence partitioner 112 returns to Operation 202*b* to select a different candidate pair, for example, by selecting a different index k or m or both within the portion of data points.

When there are no further candidate pairs to test, in one or more embodiments, the sequence partitioner 112 selects the candidate pair that minimizes a value based on $P_R$ and $P_D$ below a fixed significance threshold (Operation 202*h*). For example, the sequence partitioner 112 may determine an average or mean value of $P_R$ and $P_D$ for each candidate pair and may select the candidate pair that minimizes the average value. That is, the sequence partitioner 112 may calculate the mean significance probability and index by k and m: $\overline{p}_{km} = (p_D + p_R)/2$ and may select the k and m values that minimizes the mean significance probability value. In some embodiments, the sequence partitioner 112 may select the k and m values that minimizes the mean significance probability value such that the mean significance probability value is also below a fixed significance level, for example, below 10%, 5% or 3%.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
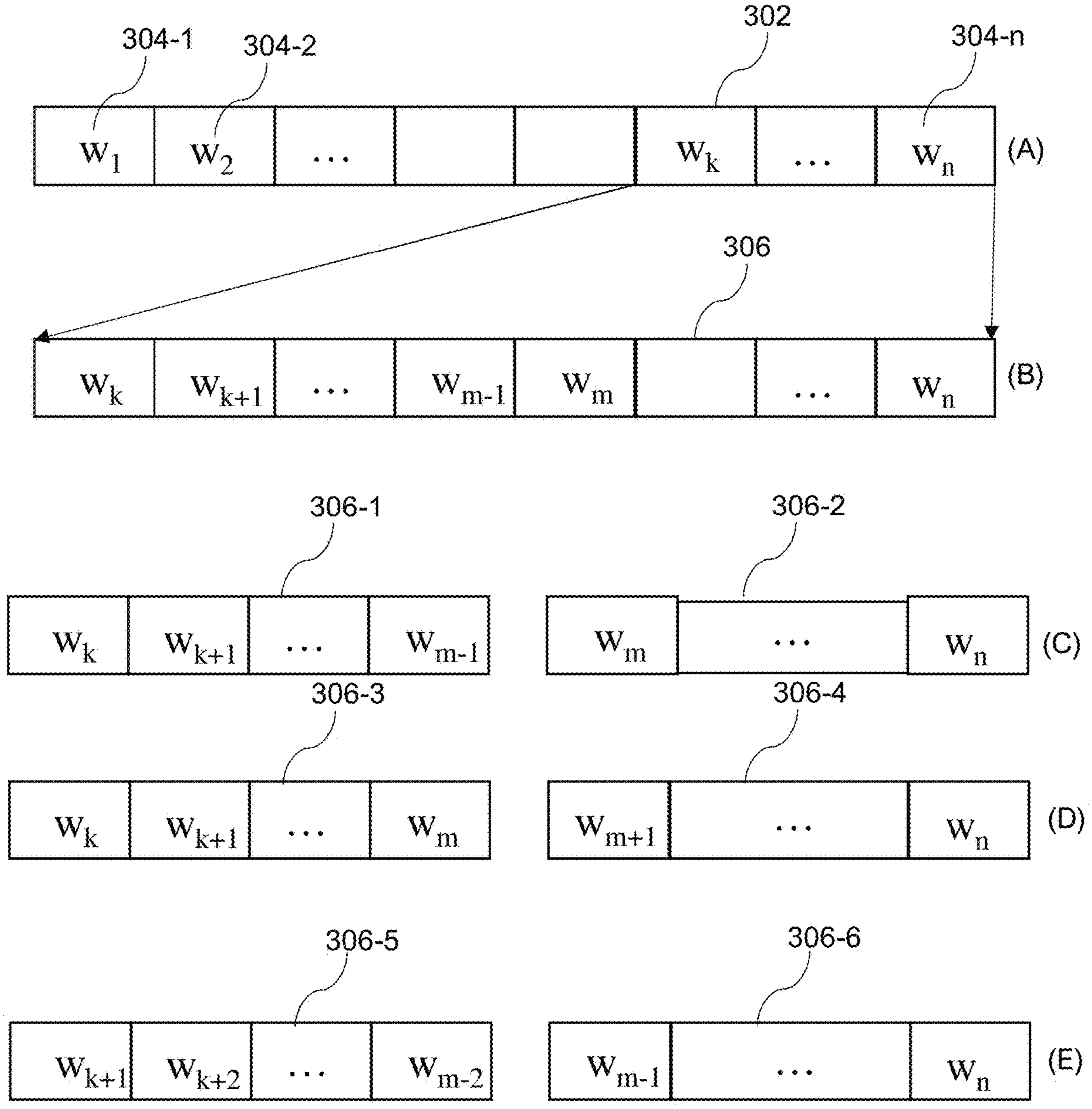
FIG. 3 illustrates an example of iterations during a partitioning operation in accordance with one or more embodiments.

FIG. 3 illustrates an example of an iterative partitioning operation in accordance with one or more embodiments. An original data sequence 302 is shown in row (A). The original data sequence 302 includes data elements 304-1, 304-2 . . . 304-*n*. The end portion of the original data sequence 302 is shown in row (B) as subsequence 306, which has data points indexed from k to n.

In row (C), the sequence partitioner 112 has selected a first candidate pair, for example, in Operation 202*b*. The first candidate pair consists of subset 306-1 and subset 306-2. Subset 306-1 includes data points indexed from k to m−1. Subset 306-2 includes data points indexed from m to n. In some embodiments, subset 306-1 may have the same number of data points as subset 306-2. In other embodiments, the number of data points in subset 306-1 may differ from the number of data points in subset 306-2. The sequence partitioner 112 may then proceed to perform the Operations 202*c*-202*g*.

Returning to Operation 202*b*, the sequence partitioner 112 has selected a second candidate pair, which consists of subset 306-3 and subset 306-4 as shown in row (D). Subset 306-3 includes all of the data points that were in subset 306-1 and the data point indexed at m, which was previously included in subset 306-2. Subset 306-4 includes all of the data points that were in subset 306-2, except for the data point indexed at m. The sequence partitioner 112 may then proceed to perform the Operations 202*c*-202*g*.

In row (E), the sequence partitioner 112 has selected a third candidate pair, which consists of subset 306-5 and subset 306-6. Subset 306-5 includes all of the data points that were in subset 306-1 except for the data point indexed at k and the data point indexed at m−1. Subset 306-6 may include all of the data points that were in subset 306-2 and the data point indexed at m−1. The sequence partitioner 112 may then proceed to perform the Operations 202*c*-202*g*.

The sequence partitioner 112 may continue selecting all possible permutations of candidate pairs of subsets of the subsequence 306 at Operation 202*b* by changing the starting index k and/or the dividing point index m. In some embodiments, a subset in a candidate pair may have a minimum of 5 data points.

Figure 4A:
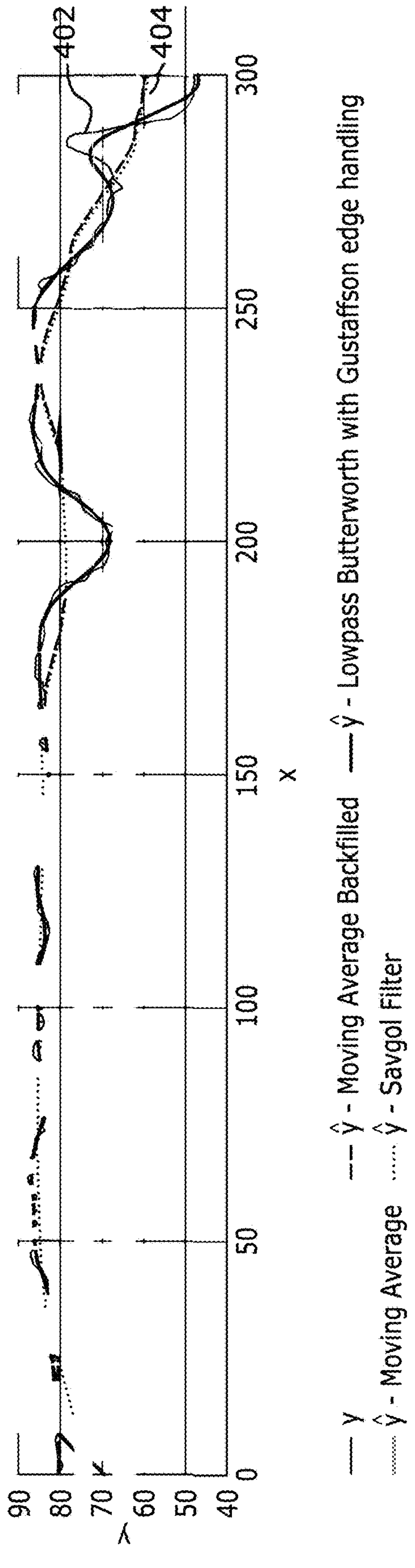
FIGS. 4A and 4B illustrate an example of a sequence before and after various smoothing operations.
Figure 4B:
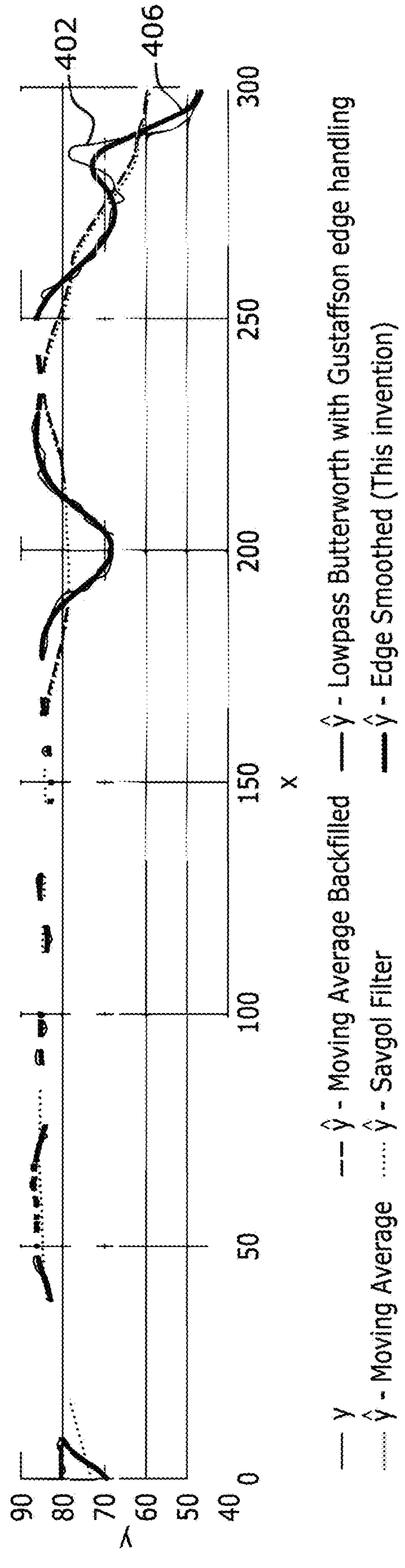

FIGS. 4A and 4B illustrate an example of a signal before and after various smoothing operations. FIG. 4A shows an original data sequence 402 that is not smoothed. Data sequence 404 represents the original data sequence 402 after a conventional smoothing technique, a Savitzky-Golay (Savgol) filter, was applied. FIG. 4B shows the original data sequence 402 that is not smoothed. Data sequence 406 represents the original data sequence 402 after the smoothing technique described herein was applied to the beginning 10% and end 10% of the original data sequence 402.

Figure 5A:
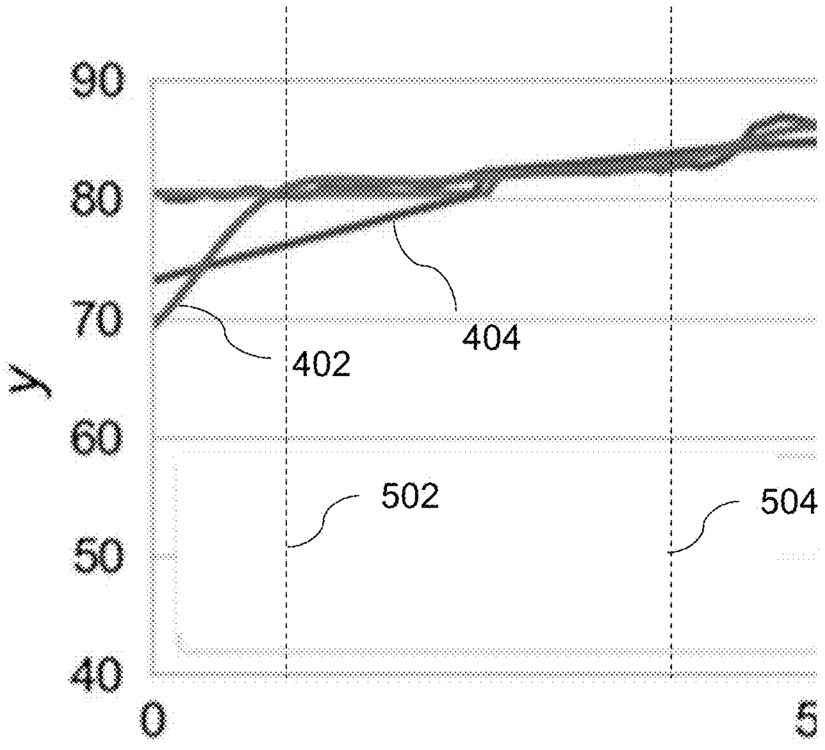
FIGS. 5A and 5B show an enlarged view of the beginning of the sequences shown in FIG. 4.
Figure 5B:
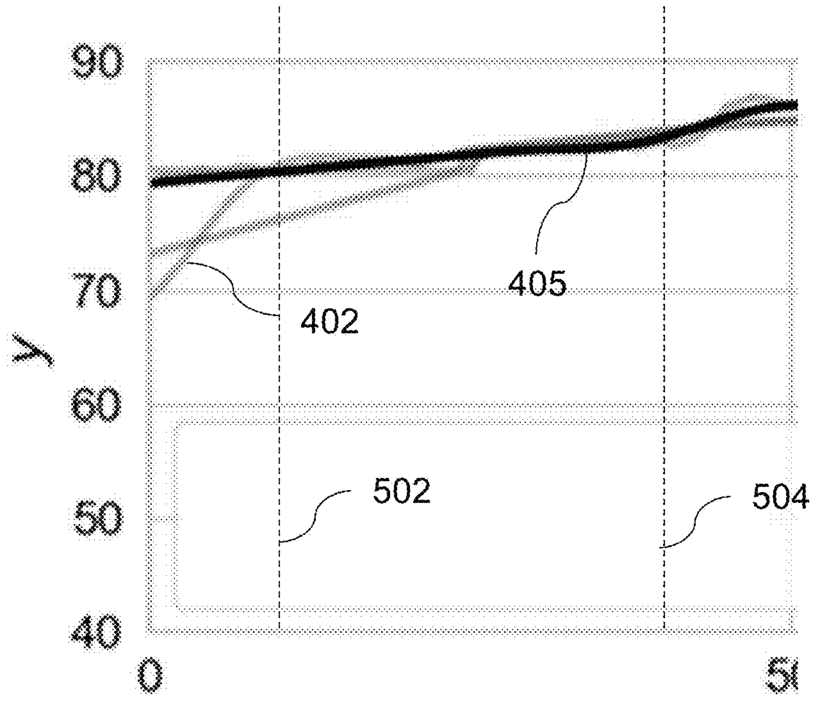

FIGS. 5A and 5B show an enlarged view of the beginning of the signal shown in FIG. 4. In FIG. 5A, the subsequence of the original data sequence 402 that occurs between the vertical y axis and the line 502 may be an unstable subsequence. The subsequence of the original signal 402 that occurs between the line 502 and the line 504 may be a stable subsequence. The conventionally smoothed signal 404 is smoother than the original signal 402, however, it still shows drop-off and transitions somewhat abruptly into the stable subsequence. FIG. 5B shows that the unstable subsequence has been smoothed into the stable subsequence such that its rate of growth matches the rate of growth of the stable subsequence and without drop-off.

5. Practical Applications, Advantages, and Improvements

Signal smoothing technology has a broad range of practical applications. In fields such as environmental monitoring, signal smoothing can be used to remove noise or irregularities from sensor data. This helps in obtaining a clearer understanding of the trends or patterns in the data, such as detecting long-term changes in air quality or water pollution levels. Signal smoothing techniques are commonly used in image and video processing to reduce noise and enhance the visual quality of images. Signal smoothing techniques can help remove artifacts or imperfections caused by factors such as sensor limitations, compression, or transmission errors. This is especially useful in applications like digital photography, video surveillance, and medical imaging. Signal smoothing can be applied to financial data to eliminate short-term fluctuations or noise, allowing analysts to focus on long-term trends and patterns. Signal smoothing techniques can help in identifying underlying market trends, making predictions, and developing investment strategies. Signal smoothing techniques can enhance the quality of recorded audio by reducing background noise or disturbances. Enhancing the quality of recorded audio can be useful in applications like speech recognition, audio restoration, noise cancellation, and telecommunication systems. Signal smoothing is frequently used in analyzing time-dependent data, such as stock market prices, weather patterns, or physiological signals. By removing noise or irregularities, signal smoothing helps reveal the underlying trends, seasonal patterns, or cyclical behavior in the data. In geophysics, signal smoothing can be applied to seismic data or geospatial measurements to eliminate noise caused by factors such as instrument errors, atmospheric interference, or random fluctuations. Eliminating noise in a signal aids in extracting valuable geological information and identifying seismic events or geological structures.

One or more embodiments improve on conventional signal processing methods in several ways. Some of the most common conventional methods for smoothing univariate signals include filter-based methods and function fitting methods. The filter-based approaches include the low-pass filter, which attenuates high-frequency oscillations over a certain frequency threshold; and the Butterworth filter, which attempts to return a flat frequency response in the pass band and a zero-frequency response in the stop band, all while having a smooth slope between the two for attenuation. A one-dimension Kalman Filter can also be used to smooth univariate signals by sequentially predicting the next element in the signal and updating that based on the next observed value.

Conventional function fitting approaches attempt to fit a function to the series that accounts for a noise component which can then be discarded. For instance, the moving average methods represents the core signal as the window mean with the noise being the variance around the mean; exponential smoothing takes a linearly-weighted combination of values with decreasing weights further away; the Savitzky-Golay filter fits a series of low-order polynomials in each window and takes the average; and the Kolmogorv-Zurbenko filter uses repeated application of the moving average across a given series for a pre-defined number of iterations. Function fitting approaches also include fitting an Artificial Neural Network (ANN) to a univariate signal by treating the next element, that is to be smoothed, as the dependent/target variable and mining features from prior observations (e.g. first and second order derivatives), the neural network is then trained to predict the former variable from the latter variables using a specific architecture.

These conventional approaches rely on pre-defined parameters which require a decision by the end user as to what should be set. After selecting the parameters, the end user may need to inspect the smoothed result visually and subjectively to determine if the parameters were correctly chosen. While ANNs alleviate the parametric-requirement somewhat, they do require an appropriate architecture to be defined and extensive training with large volumes of data-especially if the network has many layers. Additionally, conventional smoothing methods are unable to smooth signal edges, which can lead to either no values being returned or to drop-off in the sequence values, e.g., a decay in the signal to a low value.

The one or more embodiments improve smoothing at the ends of a signal when compared to conventional methods. Further, the one or more embodiments do not require the user to set parameters, such as window size, polynomial order, or number of iterations, prior to the smoothing process, thereby reducing the need for expertise in parameter setting and trial and error. Instead, the one or more embodiments automatically detect the stable and unstable sequences and stops the smoothing process automatically when no further unstable sequences are detected, unlike some conventional methods that require a user to set a number of iterations of smoothing a priori. The one or more embodiments also do not require extensive model training and optimization, unlike artificial neural network-based approaches to signal smoothing.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
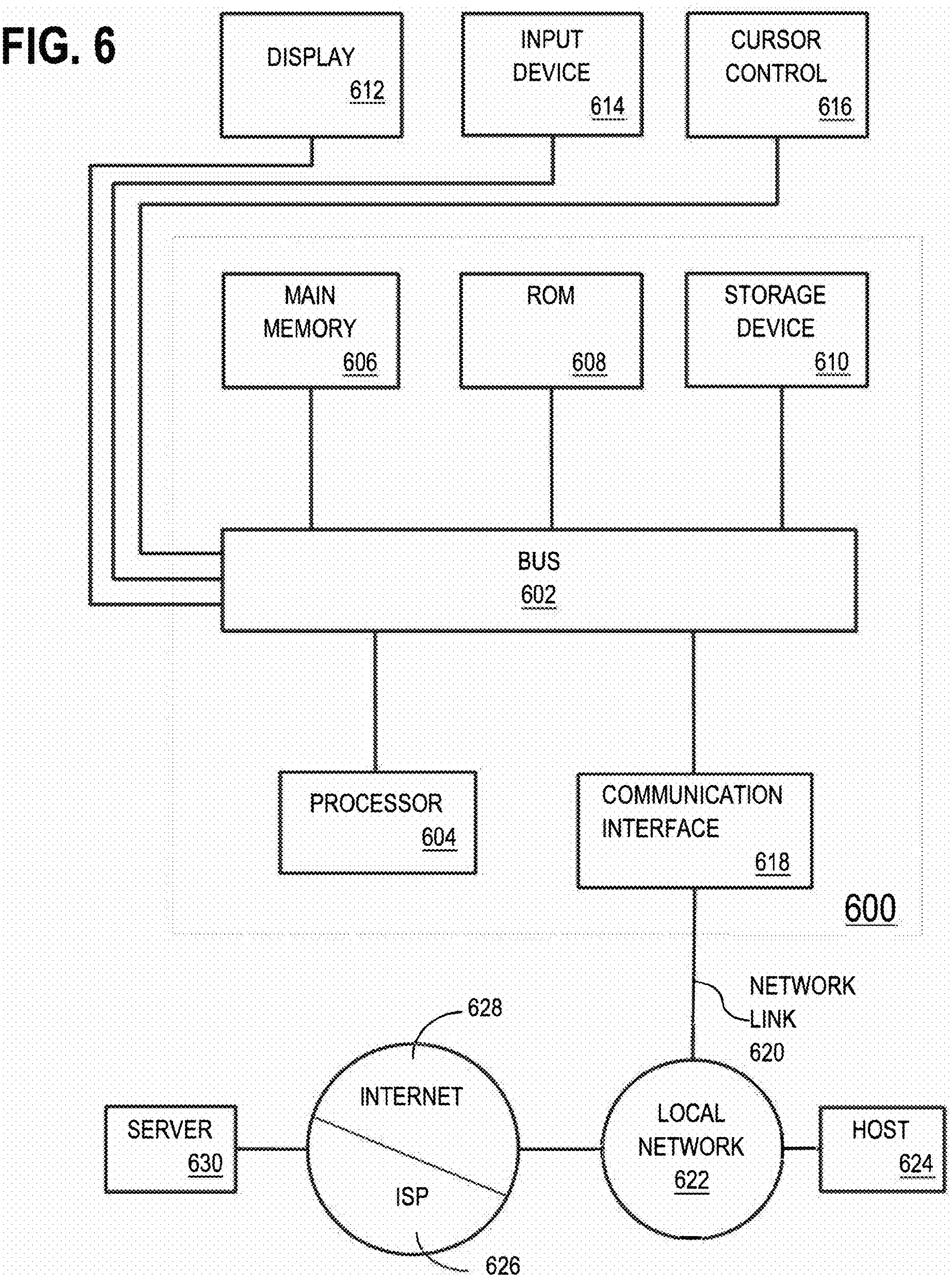
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

smoothing at least a portion of a first sequence of data points to generate a second sequence of data points at least by:

executing a partitioning operation to partition the first sequence of data points into a plurality of subsequences of data points, the partitioning operation comprising:

for all of the data points in the first sequence of data points:

a. selecting a pair of subsets of data points of the first sequence of data points comprising a first subset of data points and a second subset of data points, wherein one data point in the first subset is adjacent to a data point in the second subset;

b. deriving a significance probability $P_D$ of unstable growth from data points in the first subset;

c. deriving a significance probability $P_R$ of stable growth from data points in the second subset;

d. determining a value $P_{RD}$ based on $P_D$ and $P_R$;

e. repeating steps (a)-(d) for different pairs of subsets of data points;

f. identifying a particular pair of subsets that minimizes the value $P_{RD}$;

g. selecting the first subset of data points, in the particular pair, as a first subsequence of data points; and h. selecting the second subset of data points, in the particular pair, as a second subsequence of data points;

responsive at least to the first subsequence of data points meeting one or more instability criteria:

applying a smoothing function that replaces the first subsequence of data points in the plurality of subsequences of data points with a third subsequence of data points that is based at least in part on the second subsequence of data points; and subsequent to applying the smoothing function to replace the first subsequence of data points with the third subsequence of data points in the plurality of subsequences of data points, generating a second sequence of data points based on the plurality of subsequences of data points;

wherein the method is performed by at least one device including a hardware processor.

2. The method of claim 1, further comprising:

determining that the second subsequence of data points of the plurality of subsequences of data points meets one or more stability criteria;

determining an attribute associated with the data points in the second subsequence of data points of the plurality of subsequences of data points; and generating the third subsequence of data points based in part on the attribute associated with the data points in the second subsequence of data points.

3. The method of claim 2, wherein determining that the second subsequence of data points of the plurality of subsequences of data points meets the one or more stability criteria comprises determining that a growth rate fluctuation associated with the second subsequence of data points is below a stability probability threshold in a probability distribution.

4. The method of claim 3, wherein the stability probability threshold is 10%.

5. The method of claim 1, wherein step (f) further comprises:

identifying the particular pair of subsets that minimizes the value $P_{RD}$ for the first sequence of data points and where the value $P_{RD}$ is below a threshold.

6. The method of claim 5, wherein the threshold is 5%.

7. The method of claim 1, wherein determining the value $P_{RD}$ comprises determining one of an average or a mean of $P_D$ and $P_R$.

8. The method of claim 1, wherein determining that the first subsequence of data points of the plurality of subsequences of data points meets the one or more instability criteria comprises determining that a growth rate fluctuation associated with the first subsequence of data points exceeds an instability probability threshold in a probability distribution.

9. The method of claim 8, wherein the instability probability threshold is approximately 20%.

10. The method of claim 1, wherein the data points in the first subset of data points are disjoint from the data points in the second subset of data points; and wherein step (e) comprises repeating steps (a)-(d) for different pairs of disjoint subsets of data points.

11. The method of claim 1, wherein the data points in the first subset are consecutive and the data points in the second subset are consecutive; wherein step (g) comprises selecting the first subset of consecutive data points, in the particular pair, as the first subsequence of data points; and wherein step (h) comprises selecting the second subset of consecutive data points, in the particular pair, as the second subsequence of data points.

12. The method of claim 1, wherein the third subsequence of data points is based further on the first subsequence of data points.

13. One or more non-transitory computer readable media comprising instructions that, when executed by one or more hardware processors, cause performance of operations comprising:

smoothing at least a portion of a first sequence of data points to generate a second sequence of data points at least by:

executing a partitioning operation to partition the first sequence of data points into a plurality of subsequences of data points, the partitioning operation comprising:

for all of the data points in the first sequence of data points:

a. selecting a pair of subsets of data points of the first sequence of data points comprising a first subset of data points and a second subset of data points, wherein one data point in the first subset is adjacent to a data point in the second subset;

b. deriving a significance probability $P_D$ of unstable growth from data points in the first subset;

c. deriving a significance probability $P_R$ of stable growth from data points in the second subset;

d. determining a value $P_{RD}$ based on $P_D$ and $P_R$;

e. repeating steps (a)-(d) for different pairs of subsets of data points;

f. identifying a particular pair of subsets that minimizes the value $P_{RD}$;

g. selecting the first subset of data points, in the particular pair, as a first subsequence of data points; and h. selecting the second subset of data points, in the particular pair, as a second subsequence of data points;

responsive at least to the first subsequence of data points meeting one or more instability criteria:

applying a smoothing function that replaces the first subsequence of data points in the plurality of subsequences of data points with a third subsequence of data points that is based at least in part on the second subsequence of data points; and subsequent to applying the smoothing function to replace the first subsequence of data points with the third subsequence of data points in the plurality of subsequences of data points, generating a second sequence of data points based on the plurality of subsequences of data points.

14. The one or more non-transitory computer readable media of claim 13, the operations further comprising:

determining that the second subsequence of data points of the plurality of subsequences of data points meets one or more stability criteria;

determining an attribute associated with the data points in the second subsequence of data points of the plurality of subsequences of data points; and generating the third subsequence of data points based in part on the attribute associated with the data points in the second subsequence of data points.

15. The one or more non-transitory computer readable media of claim 14, wherein determining that the second subsequence of the plurality of subsequences of data points meets the one or more stability criteria comprises determining that a growth rate fluctuation associated with the second subsequence of data points is below a stability probability threshold in a probability distribution.

16. The one or more non-transitory computer readable media of claim 13, wherein step (f) further comprises:

identifying the particular pair of subsets that minimizes the value $P_{RD}$ for the first sequence of data points and where the value $P_{RD}$ is below a threshold.

17. A system comprising:

one or more processors; and memory storing instructions that, when executed by the one or more processors, cause the system to perform:

smoothing at least a portion of a first sequence of data points to generate a second sequence of data points at least by:

executing a partitioning operation to partition the first sequence of data points into a plurality of subsequences of data points, the partitioning operation comprising:

for all of the data points in the first sequence of data points:

a. selecting a pair of subsets of data points of the first sequence of data points comprising a first subset of data points and a second subset of data points, wherein one data point in the first subset is adjacent to a data point in the second subset;

b. deriving a significance probability $P_D$ of unstable growth from data points in the first subset;

c. deriving a significance probability $P_R$ of stable growth from data points in the second subset;

d. determining a value $P_{RD}$ based on $P_D$ and $P_R$;

e. repeating steps (a)-(d) for different pairs of subsets of data points;

f. identifying a particular pair of subsets that minimizes the value $P_{RD}$;

g. selecting the first subset of data points, in the particular pair, as a first subsequence of data points; and h. selecting the second subset of data points, in the particular pair, as a second subsequence of data points;

responsive at least to the first subsequence of data points meeting one or more instability criteria:

applying a smoothing function that replaces the first subsequence of data points in the plurality of subsequences of data points with a third subsequence of data points that is based at least in part on the second subsequence of data points; and subsequent to applying the smoothing function to replace the first subsequence of data points with the third subsequence of data points in the plurality of subsequences of data points, generating a second sequence of data points based on the plurality of subsequences of data points.

18. The system of claim 17, further comprising:

determining that the second subsequence of data points of the plurality of subsequences of data points meets one or more stability criteria;

determining an attribute associated with the data points in the second subsequence of data points of the plurality of subsequences of data points; and generating the third subsequence of data points based in part on the attribute associated with the data points in the second subsequence of data points.

19. The system of claim 18, wherein determining that the second subsequence of the plurality of subsequences of data points meets the one or more stability criteria comprises determining that a growth rate fluctuation associated with the second subsequence of data points is below a stability probability threshold in a probability distribution.

20. The system of claim 18, wherein step (f) further comprises:

identifying the particular pair of subsets that minimizes the value $P_{RD}$ for the first sequence of data points and where the value $P_{RD}$ is below a threshold.

* * * * *